Lowth & Howe.
Cultivator-Tooth.
N° 75436        Patented Mar. 10, 1868
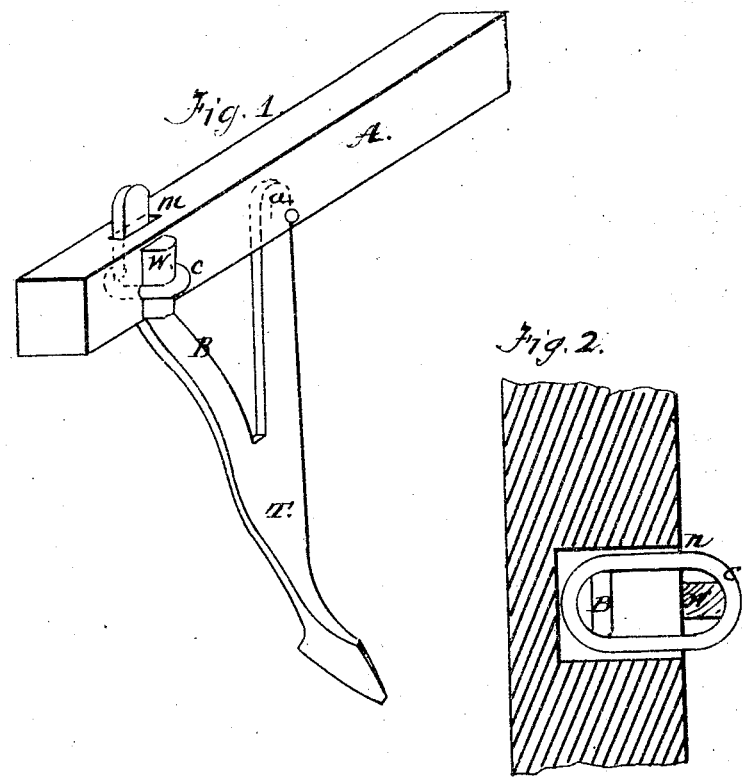

United States Patent Office.

M. F. LOWTH AND T. J. HOWE, OF OWATONNA, MINNESOTA.

Letters Patent No. 75,436, dated March 10, 1868.

IMPROVEMENT IN CULTIVATOR-TOOTH.

The Schedule referred to in these Letters Patent and making part of the same.

TO ALL WHOM IT MAY CONCERN:

Be it known that we, M. F. LOWTH and T. J. HOWE, of Owatonna, in the county of Steele, and State o Minnesota, have invented a new and improved Cultivator-Tooth; and we do hereby declare the following to be a full, clear, and exact description of the same, sufficient to enable those skilled in the art to which our invention appertains to make use of it, reference being had to the accompanying drawings forming part of this specification, in which—

Figure 1 is a perspective view, and

Figure 2 a horizontal section of our invention.

In this invention the tooth is hinged, and provided with a brace, by which the angle of the tooth with the ground can be regulated, and which also operates to prevent the breaking of the tooth or beam by obstacles in the way of the cultivator.

In the drawings, A represents the beam of the cultivator, to which the tooth T is hinged, at $a$, so that its lower end can be swung backward and forward under the beam. From about the middle of the shank of the tooth a curved branch or brace, B, extends backward and upward, passing through a vertical mortise, $m$, in the beam. It is secured in that position by a link, $c$, which is inserted through a mortise, $n$, in the side of the beam, and passes around the brace, clamping it firmly against the side wall $o$ of the mortise $m$. The link is made to clasp the brace with great power by means of a wedge, $w$, driven through its outer end, and operating against the outside of the beam. This construction allows the tooth T to be set at any inclination to the ground, and thus adjusted to work either in a loose or a compact hard soil. It also prevents the breaking of the beam or tooth by obstacles in the way of the cultivator, since the wedge $w$ may be inserted so as to hold the brace B with sufficient force to enable it to do its work, but not to resist obstacles. When it is thus inserted, an obstacle striking against the tooth will only swing it back on its hinge and allow it to pass over without injury.

We are aware that a screw-threaded eye-bolt and nut have been used in a somewhat similar manner and for the same purpose as our invention, but we lay no claim to such device; but What we do claim as our invention, and desire to secure by Letters Patent, is—

The combination of the beam A, having the mortises $m$ $n$, as described, with the link $c$, wedge $w$, and hinged tooth T, having the brace B, substantially as and for the purposes set forth.

M. F. LOWTH,
T. J. HOWE.

Witnesses:
A. M. KINYON,
J. Q. BRADEN.